June 8, 1965     J. S. COOK ETAL     3,188,639
SATELLITE STABILIZATION AND ATTITUDE CONTROL
Filed Sept. 29, 1961
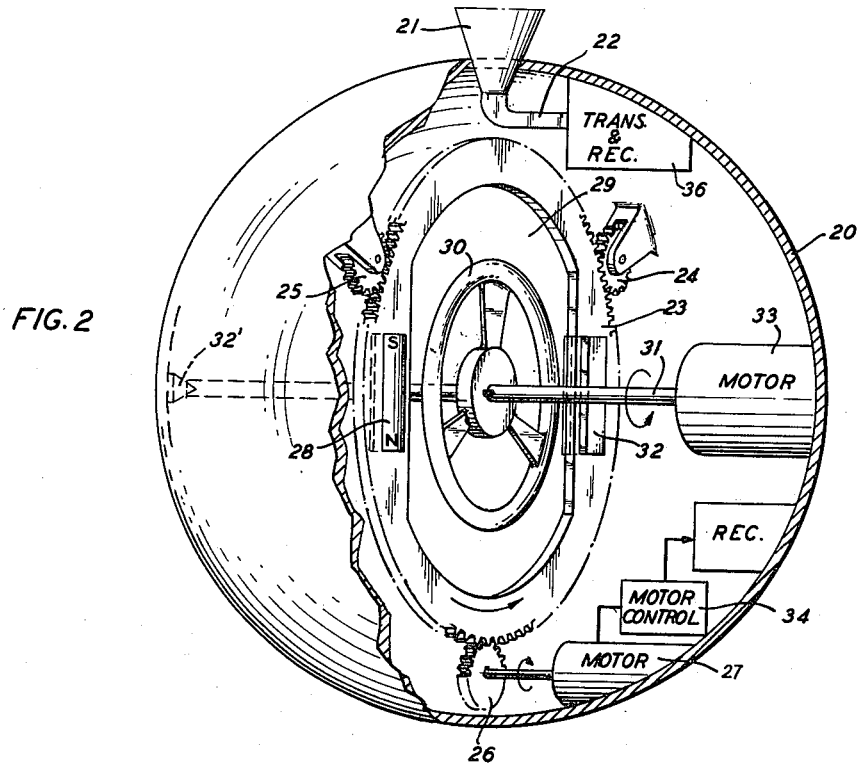
FIG. 2
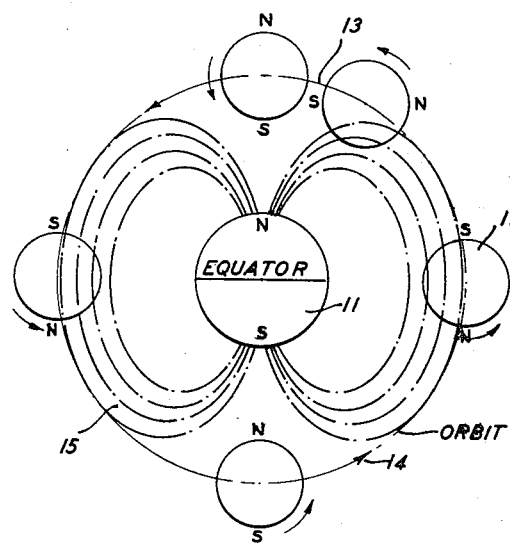
FIG. 1
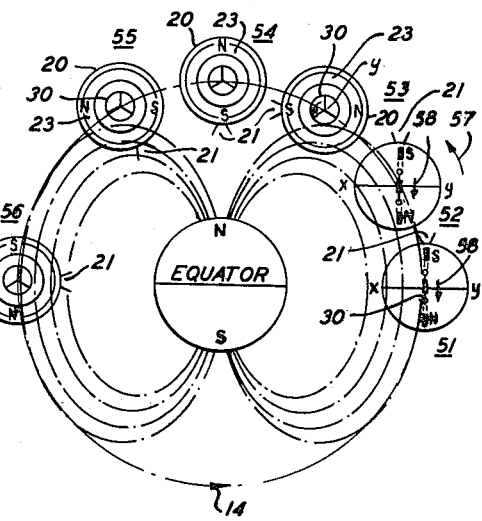
FIG. 3
FIG. 4
INVENTORS J. S. COOK
W. E. DANIELSON
BY
ATTORNEY

United States Patent Office 3,188,639
Patented June 8, 1965

3,188,639
SATELLITE STABILIZATION AND ATTITUDE CONTROL
John S. Cook, New Providence, and Warren E. Danielson, Berkeley Heights, N.J., assignors to Bell Telephone Laboratories, Incorporated, New York, N.Y., a corporation of New York
Filed Sept. 29, 1961, Ser. No. 141,648
6 Claims. (Cl. 343—100)

This invention relates to earth satellites and in particular to the control of the spatial orientation or attitude of an earth satellite for a communication system.

The use of an earth satellite as a relay station in a line of sight communication system has been proposed in which the satellite is equipped with transmitting and receiving equipment by means of which a signal from a first earth station may be detected, increased in level, and radiated toward another earth station of the system. The satellite must be furnished either with an antenna that is isotropic or non-directive, or with one that is directive. The directive antenna obviously requires less power and is, therefore, preferred. However, where use of the directivity is to be achieved, either this antenna or the satellite which carries it must be controlled in spatial orientation or attitude so that the radiation pattern of the antenna will coincide with the desired radiation path. In general, this means that the radiation pattern of the antenna should be directed toward the face of the earth for as much of the time as possible.

It has been further proposed to use the earth's geomagnetic field to constrain and maintain the attitude of the satellite. One system proposed involves the interaction of a permanent magnet dipole within the satellite with the magnetic field of the earth much like the needle of a compass. Suitable physical structures nad damping techniques for this method are disclosed in the copending application of L. Rongved and I. E. Yu, Serial No. 113,-709, filed May 31, 1961, and in an article entitled "Control of Earth Satellite Motions by Magnetic Devices," by R. E. Fischell, in the Applied Physics Laboratory of Johns Hopkins University publication APL/JHU/TG 60-31.

When a magnetically oriented satellite is launched in a polar or near polar orbit, the choice of this orbit being determined by factors not here of importance, and after spurious motion has been damped by the means disclosed in the above-mentioned application and publication, the satellite is constrained to make two revolutions per orbit about an axis normal to the axis of its magnetic dipole. The magnetic orientation, however, does not constrain the rotation or roll of the satellite about an axis parallel with the magnetic axis.

It is, therefore, an object of the present invention to further stabilize and orient the attitude of satellites stabilized by magnetic orientation so that the satellite maintained the same face toward the earth at all times.

In accordance with a first feature of the invention, it has been recognized that a single reaction or gyroscopic wheel supported to rotate about an axis normal to the magnetic axis of the satellite will cooperate with the rotation produced by the magnetic orientation to eliminate roll. More particularly, the resultant of the torque produced by the magnetically produced two revolutions per orbit rotation and the gyroscopic torque is to stably align the axis of the reaction wheel normal to the plane of the satellite orbit, with the direction of gyroscopic spin the same as the orbital spin of the satellite.

In accordance with a second feature of the invention, the satellite is constructed with an inner and an outer portion. The portions are stabilized according to the first feature of the invention and then the outer portion, which supports the antenna, is back-rotated one revolution per orbit with respect to the inner portion to maintain a single face of the satellite toward the earth at all times.

These and other objects and features, the nature of the present invention and its various advantages will appear more fully upon consideration of the specific illustrative embodiments shown in the accompanying drawings and described in detail in the following explanation of these drawings.

In the drawings:

FIG. 1 is a schematic representation of a magnetically oriented satellite in various positions in a polar orbit about the earth;

FIG. 2 is a perspective view, partly in cross-section and partly in schematic, of the mechanical details of the satellite attitude control system in accordance with the invention;

FIG. 3, given for the purpose of explanation, is a schematic of a satellite in accordance with the invention in various attitudes and positions in its orbit about the earth; and FIG. 4 is a vector diagram of torques involved in FIG. 3.

Referring more particularly to FIG. 1, a graphic representation is shown of a space system in which a satellite is revolving in a polar orbit and is magnetically oriented in the manner contemplated by the prior art. The earth 11 is viewed from a point in space on the equatorial plane and the geomagnetic field of the earth is represented by the lines 15. An earth satellite 12 is shown in several positions about its polar orbit 13 traveling in this orbit in a counterclockwise direction as shown by the arrow 14. The stabilizing magnetic dipole within satellite 12 is represented by the designations N and S on opposite sides of the satellite, representing the south seeking pole and the north seeking pole, respectively.

After any initial spin or random tumbling resulting from its launch has been damped by various means known to the art, the magnetic dipole of satellite 12 will align itself with the geomagnetic field 15 of the earth. Therefore, as the satellite travels about orbit 13 it will be constrained to rotate about an axis normal to its magnetic axis at two revolutions per orbit in a counterclockwise direction for the orbit direction assumed. Thus, it completes one revolution when it passes over the earth's northpole and a second revolution when it passes over the earth's southpole.

Even though one face of the satellite is not always pointed toward the earth, the orientation described provides substantial improvement. Thus, an antenna having a directive conical or biconical radiation pattern can be located to provide adequate transmission or reception with major portions of the earth's surface even though there will be complementary dead zones of inadequate transmission. However, it is still not possible to employ an antenna having a highly directive pencil beam since the satellite is free to roll in any random way about the axis of the magnetic dipole.

Referring now to FIG. 2, a satellite structure is shown which includes the additional stabilization and attitude control means in accordance with the invention. The satellite comprises an essentially spherical body 20 taken as illustrative of a typical satellite vehicle. This structure will be referred to hereinafter as the outer body of the satellite. It supports the highly directive antenna, typically illustrated by horn 21 and its associated waveguide feed 22 disposed to radiate through an aperture in body 20. Details of assoicated transmitting and receiving equipment 36 are not shown.

Supported for rotation within outer body 20 is an inner body 23. As illustrated, inner body 23 comprises the larger one of a system of planetary or epicycle wheels or gears. Body 23 is supported for rotation by a plurality of smaller gears or wheels 24 through 26 which, in turn, revolve on shafts rigidly supported by outer body 20. Gear 26 constitutes a driving gear and its shaft is connected to a suitable source of motive power represented by motor 27. The remaining gears 24 and 25 are idlers. While a system of gears have been illustrated it is understood that the embodiment shown in the drawing is to be taken as illustrative only and no attempt has been made to illustrate mechanical details familiar to those skilled in the art. Thus, guides, slides, tracks, and other forms of bearing support may be employed.

Motor 27 may be of simple and light-weight design since its load is small and the speed required is low. For example, it can be either a direct current or alternating current motor, and in either form it can be simplified by utilizing a permanent magnet as either the rotor or stator. It can also be a clock-work of mechanical design. In one of the simpler forms it need only be a combination of a ratchet and solenoid together with a suitable gear train and a source of electrical impulses for the solenoid. In any event, its operation is preferably under control of the received signal, either a specific command signal or the communication signal itself. In FIG. 2 this control is represented by motor control circuit 34 which should at least be capable of stopping and starting the motor at desired times. Further consideration of motor 27 and control circuit 34 will be undertaken hereinafter in connection with the mode of operation of the invention.

The orienting magnetic dipole is carried on inner body 23 with the magnetic axis thereof aligned normal to the axis of rotation of body 23. As illustrated, magnet 28 may take the form of at least one elongated permanent bar magnet 28 and in a typical arrangement may be set into one side of body 23. Obviously, magnet 28 may be one or more electromagnets if preferred and, according to one proposal made heretofore, may be the magnetic focusing structure of the traveling wave amplifier in the receiver.

Inner body 23 is illustrated as having a large aperture 29 cut out of its center within which reaction wheel 30 is suspended on shaft 31 for rotation about the same axis as that of body 23. Wheel 30 is constructed in the manner conventional for gyroscopes in order to give it as large a mass of revolution and as large a moment of inertia as is practical for a given size and weight. Shaft 31 is provided with suitable bearings at the ends thereof as illustrated schematically by bearing 32' and with suitable means for driving it as represented by motor 33. Motor 33 may again be simple in design and may comprise nothing more than a small permanent magnet rotor with a stator comprising a pair of coils mounted 90 degrees in space and excited in phase quadrature.

Suitably disposed at any point within the satellite is means for damping initial motion of the satellite. In a typical launch, the satellite may have either an initial spin as a result of the last phase of the launching process or it may be released without any predetermined motion and have, therefore, only a random tumbling. In either case, this initial motion must be reduced to zero before stabilization in accordance with the invention can take effect. As illustrated in FIG. 2, the damping means is shown schematically by the box 32 which, for convenience, is located upon inner body 23 as a counter-poise for magnet 28. Damping means 32 may take any one of several forms known to the art and may be, for example, of the shorted coil type, the eddy current type, the hysteresis type, the viscous liquid flow type, the gravitational type, or any of the other forms described in the above-mentioned publication and application.

The operation of the invention may now be further analyzed with reference to FIG. 3 which combines certain details of FIG. 1 and FIG. 2. Thus, corresponding reference numerals have been employed to designate corresponding components of the space system of FIG. 1 and components of the satellite of FIG. 2. First, let it be assumed that random motion has been damped and that the inner body 23 of the satellite has become magnetically oriented in the manner described with reference to FIG. 1. Thus, the satellite, including its outer body 20, its antenna 21, its inner body 23 magnetically polarized as represented by the designations N and S, and its reaction wheel 30 are shown in various positons and attitudes 51 through 54 in orbit 13. Further assume that motor 27 has not been started and that the outer body 20 has been initially set with respect to inner body 23 so that the S pole is aligned with antenna 21. This condition exists for positions 51 through 54.

The positions designated 53 through 56 are stable ones while those at 51 and 52 are disturbed and unstable and are used in explaining the action. The arrow 58 on reaction wheel 30 in the positions 51 and 52 indicates the direction in which the rim of the wheel nearest the observer is moving. Assume that at some time after the satellite has reached its orbit it has rolled into the unstable attitude represented by position 51 with the reaction wheel axis $xy$ directed radially to the orbit plane, that is, pointing away from the earth. The angular velocity of rotating wheel 30 may then be represented by a vector directed parallel to the axis $xy$ and, therefore, radial to the orbit. This is shown by the vector A in the vector diagram of FIG. 4. As the satellite continues in its orbit and carries the reaction wheel 30 to position 52, the axis of the wheel will tend to continue to point in the same direction as it did at position 51, thereby bringing the polarizing magnet upon inner body 23 out of line with the earth's geomagnetic field. The attraction of the geomagnetic field for the magnet, however, sets up a torque which tends to produce a counterclockwise rotation of the entire system about an axis perpendicular to the paper as represented by the arrow 57. The additional angular velocity produced by this torque is represented in FIG. 4 by the vector B directed normal to the orbit plane or normal to the plane of the paper. Adding the vectors A and B yields the resultant R as the direction toward which the axis of wheel 30 turns. Consequently, the shaft end $y$ will move out of the plane of the paper and the shaft end $x$ will move into the plane of the paper. As the wheel is carried forward by the orbit, precessional motion occurs. As soon as this motion is damped by damping means 32, the shaft of the wheel becomes perpendicular to the plane of the orbit, with the shaft end $y$ pointing toward the observer as at position 53. When the satellite reaches this position, vectors A and B will be coincident and the angular velocity produced by the rotation of inner body 23 as the magnet follows the earth's field will exert no further torque action upon the axis of wheel 30 which will, therefore, remain normal to the plane of the orbit as at positions 54 through 56. Roll of the satellite about its magnetic axis has thus been eliminated.

Note that at position 53 antenna 21 is not directed toward the earth. However, as the satellite turns at its two revolutions per orbit speed, it reaches a point directly over the earth's N pole, as represented by position 54, at which antenna 21, which was previously aligned with the S pole of the satellite, is pointing toward the earth. At this time, motor 27 is started by a suitable commnad signal from the earth or by a timer within the satellite. Motor 27 back-rotates outer body 20 and antenna 21 at substantially one revolution per orbit with respect to inner body 23. The result is represented at positions 55 and 56 which show antenna 21 directed toward the earth even though the magnetic orientation of inner body 23 is otherwise aligned with the earth's geomagnetic field.

Since it is believed that the configuration of the earth's geomagnetic field is not such as to produce the two revolutions per orbit rotation at a linear rate during all parts of the orbit, a refined embodiment of the invention contemplates that the back-rotation of one revolution per orbit take place at a similar non-linear rate. This is readily obtained by causing motor control circuit 34 to be responsive to the intensity of the signal received at the satellite from the earth or responsive to a command signal from the earth which keeps the earth received signal at a desired level.

It should be noted that the physical arrangement of the components as illustrated in FIG. 2 may undergo considerable variation. For example, it is immaterial whether reaction wheel 30 is supported upon inner body 23 or upon outer body 20 as illustrated. Similarly, it is immaterial upon which body the components of the transmitter and receiver are located. It is possible, therefore, that all components except the antenna and its support be located upon the inner body. The antenna support will then comprise the outer body.

In all cases it is to be understood that the above-described arrangements are merely illustrative of a small number of the many possible applications of the principles of the invention. Numerous and varied other arrangements in accordance with these principles may readily be devised by those skilled in the art without departing from the spirit and scope of the invention.

What is claimed is:

1. Apparatus for stabilizing a communication satellite comprising a magnet mounted within said satellite and having a magnetic axis which tends to align itself with the geomagnetic field of the earth, gyroscopic wheel supported and constrained with respect to said magnet to rotate about an axis normal to said magnetic axis, means for driving said gyroscopic wheel to produce a gyroscopic torque that tends to align the axis of said wheel with respect to the torque produced by said magnet as it aligns itself with said geomagnetic field, and means for damping precessional movements of said satellite caused by the interaction of said torques.

2. A communications satellite comprising a magnet mounted within said satellite and having a magnet axis which tends to align itself with the geomagnetic field of the earth, a wheel of significant mass supported within said satellite and being driven about an axis normal to said magnetic axis to produce a gyroscopic torque that tends to align the axis of said wheel with respect to the torque produced by said magnet as it aligns itself with said geomagnetic field, a highly directive antenna for said satellite supported for movement about the axis of said wheel, and means for moving said antenna relative to said magnet about the axis of said wheel.

3. The satellite according to claim 2 wherein said satellite has a given orbit period and wherein said means for moving said antenna produces one revolution of said antenna about the axis of said wheel in said given period.

4. The satellite according to claim 2 including means for controlling the movement of said antenna in response to signals received from the earth.

5. Apparatus for stabilizing a communication satellite, said satellite having an inner structure and an outer structure arranged to rotate with respect to each other about a single common axis, a magnet rigidly connected to said inner structure having the magnetic axis thereof in a plane normal to said common axis, a gyroscopic wheel mounted upon one of said structures and constrained to be driven about said common axis to produce a gyroscopic torque that reacts with a torque produced as said magnet follows the geomagnetic field of the earth, and means for rotating said inner structure with respect to said outer structure to maintain a given relationship between one of said structures and the earth.

6. A communication satellite having an inner structure and an outer structure arranged to rotate with respect to each other about a common axis, means for magnetically polarizing said inner structure in a direction normal to said axis, a wheel of significant moment of inertia mounted upon one of said structures to be driven about said axis to produce a gyroscopic torque that reacts with a torque produced as the magnetic polarization of said inner structure follows the geomagnetic field of the earth, an antenna of high directivity forming a part of said outer structure, and means for rotating said outer structure with respect to said inner structure one revolution in the orbit period of said satellite.

No references cited.

CHESTER L. JUSTUS, *Primary Examiner.*